(12) United States Patent
Nakatsu (10) Patent No.: US 8,972,796 B2
(45) Date of Patent: Mar. 3, 2015

(54) SUPPORT SYSTEM AND METHOD FOR ERROR RECOVERY IN AN ELECTRONIC DEVICE

(75) Inventor: Kenta Nakatsu, Osaka (JP)

(73) Assignee: KYOCERA Document Solutions Inc. (JP)

( * ) Notice: Subject to any disclaimer, the term of this patent is extended or adjusted under 35 U.S.C. 154(b) by 343 days.

(21) Appl. No.: 13/591,986

(22) Filed: Aug. 22, 2012

(65) Prior Publication Data

US 2013/0055035 A1 Feb. 28, 2013

(30) Foreign Application Priority Data

Aug. 23, 2011 (JP) ................................. 2011-181192

(51) Int. Cl.
*G06F 11/00* (2006.01)
*G06F 11/07* (2006.01)
*G06F 3/12* (2006.01)

(52) U.S. Cl.
CPC ........ *G06F 11/0775* (2013.01); *G06F 11/0733* (2013.01); *G06F 11/0748* (2013.01); *G06F 11/0793* (2013.01); *G06F 3/121* (2013.01)
USPC .................. 714/46; 714/57; 714/26; 714/6.31

(58) Field of Classification Search
USPC .................... 714/46, 57, 26, 6.31, 48
See application file for complete search history.

(56) References Cited

U.S. PATENT DOCUMENTS

| | | | | |
|---|---|---|---|---|
| 7,249,283 B2 * | 7/2007 | Platteter | ........................ | 714/25 |
| 7,305,465 B2 * | 12/2007 | Wing et al. | ................... | 709/223 |
| 7,334,166 B1 * | 2/2008 | Rhea et al. | ...................... | 714/46 |
| 7,389,448 B2 * | 6/2008 | Sakai | .............................. | 714/48 |
| 7,890,318 B2 * | 2/2011 | Castellani et al. | ................ | 704/9 |
| 7,917,814 B2 * | 3/2011 | Hu et al. | ......................... | 714/57 |
| 7,949,740 B2 * | 5/2011 | Scrafford et al. | ............ | 709/223 |
| 8,064,079 B2 * | 11/2011 | Kimura | ......................... | 358/1.15 |
| 8,312,324 B2 * | 11/2012 | Foley et al. | ..................... | 714/31 |
| 8,582,160 B2 * | 11/2013 | Takashima | .................. | 358/1.15 |
| 8,902,450 B2 * | 12/2014 | Scrafford et al. | ............ | 358/1.15 |
| 2002/0183881 A1 * | 12/2002 | Wright | .......................... | 700/115 |
| 2003/0110413 A1 * | 6/2003 | Bernklau-Halvor | ........... | 714/25 |
| 2004/0073403 A1 * | 4/2004 | Hart et al. | ...................... | 702/183 |
| 2004/0078783 A1 * | 4/2004 | Matsushima | ................. | 717/126 |
| 2004/0165209 A1 * | 8/2004 | Aoki et al. | ................... | 358/1.14 |

(Continued)

FOREIGN PATENT DOCUMENTS

| | | |
|---|---|---|
| JP | 08-077419 | 3/1996 |
| JP | 2002-368931 A | 12/2002 |

(Continued)

*Primary Examiner* — Loan L. T. Truong
(74) *Attorney, Agent, or Firm* — McDonnell Boehnen Hulbert & Berghoff LLP (57) ABSTRACT

An electronic device displaying an error recovery process includes an input unit, a display unit, a meta data transmitting unit, and a display control unit. The input unit accepts an operation of a user. The display unit displays an operation screen for the user. The meta data transmitting unit transmits screen image data on the display unit, user operation information input via the input unit, and state information about the electronic device, which are collected upon reception of a meta data acquisition command from a support service terminal apparatus, to the support service terminal apparatus as meta data. The display control unit displays an error recovery process on the display unit on the basis of user support data transmitted from the support service terminal apparatus in response to the transmitted meta data.

4 Claims, 6 Drawing Sheets

| storage destination pointer | snapshot image file | user operation information | state information |
|---|---|---|---|
| 1 | GB0001.png | b-1 | ............. |
| 2 | GB0002.png | b-1 | ............. |
| 3 | GB0003.png | b-3 | ............. |
| 4 | GB0004.png | b-5 | ............. |
| 5 | GB0005.png | b-2 | ............. |

71

(56) References Cited

U.S. PATENT DOCUMENTS

| | | |
|---|---|---|
| 2005/0147420 A1* | 7/2005 | Sawada et al. .................... 399/9 |
| 2006/0176513 A1* | 8/2006 | Yamashita .................. 358/1.15 |
| 2007/0109587 A1* | 5/2007 | Yamakawa .................. 358/1.14 |
| 2007/0182981 A1* | 8/2007 | Aiso ........................... 358/1.14 |
| 2008/0059836 A1* | 3/2008 | Fujii ............................. 714/15 |
| 2009/0128847 A1* | 5/2009 | Ito ............................... 358/1.15 |
| 2010/0302586 A1* | 12/2010 | Takahashi et al. ........... 358/1.15 |
| 2010/0315671 A1* | 12/2010 | Shimazaki .................. 358/1.15 |
| 2011/0075191 A1* | 3/2011 | Meunier et al. ............. 358/1.15 |
| 2011/0093749 A1* | 4/2011 | McGuffin et al. ............... 714/46 |
| 2011/0164276 A1* | 7/2011 | Hata ............................ 358/1.15 |
| 2011/0170138 A1 | 7/2011 | Takahashi et al. |
| 2012/0030585 A1* | 2/2012 | Akuzawa ..................... 715/747 |

FOREIGN PATENT DOCUMENTS

| | | |
|---|---|---|
| JP | 2005-332129 | 12/2005 |
| JP | 2010-074522 | 4/2010 |
| JP | 2011-000742 A | 1/2011 |
| JP | 2011-016340 A | 1/2011 |

* cited by examiner

| storage destination pointer | snapshot image file | user operation information | state information |
|---|---|---|---|
| 1 | GB0001.png | b-1 | ............ |
| 2 | GB0002.png | b-1 | ............ |
| 3 | GB0003.png | b-3 | ............ |
| 4 | GB0004.png | b-5 | ............ |
| 5 | GB0005.png | b-2 | ............ |

SUPPORT SYSTEM AND METHOD FOR ERROR RECOVERY IN AN ELECTRONIC DEVICE

PRIORITY AND INCORPORATION BY REFERENCE

This application is based upon and claims the benefit of priority from the corresponding Japanese Patent application No. 2011-181192, filed Aug. 23, 2011, the entire contents of which is incorporated herein by reference.

BACKGROUND

The present invention relates to a support service system, an electronic device, and an image forming apparatus that display an error recovery process.

If an error occurs in an electronic device, a user may make an inquiry to, for example, a support service to correct the error.

In a support service system, an operator acquires an operation log of an electronic device by operating a monitoring terminal to know the operation status of each customer. In another support service system, an image processing apparatus at a user's side holds data about user operations and transmits that user operation data to a support personal computer (PC).

In another system, an information terminal transmits an error code and receives a recovery method corresponding to the error code to display the received recovery method.

With the above technology, although the recovery method corresponding to the error code is displayed, a stereotypical recovery method is displayed for each error event and, for example, the state of the device is not considered. Accordingly, the user may not be able to provide an appropriate response to the error.

SUMMARY

An electronic device according to an embodiment of the present disclosure displays an error recovery process. The electronic device includes an input unit, a display unit, a meta data transmitting unit, and a display control unit. The input unit accepts an operation of a user. The display unit displays an operation screen for the user. The meta data transmitting unit transmits screen image data on the display unit, user operation information input via the input unit, and state information about the electronic device, which are collected upon reception of a meta data acquisition command from a support service terminal apparatus, to the support service terminal apparatus as meta data. The display control unit displays an error recovery process on the display unit on the basis of user support data transmitted from the support service terminal apparatus in response to the transmitted meta data.

An image forming apparatus according to an embodiment of the present disclosure displays an error recovery process. The image forming apparatus includes an input unit, a display unit, an internal unit, a meta data transmitting unit, and a display control unit. The input unit accepts an operation of a user. The display unit displays an operation screen for the user. The internal unit carries out a function of the image forming apparatus. The meta data transmitting unit transmits screen image data on the display unit, user operation information input via the input unit, and state information about the internal unit, which are collected upon reception of a meta data acquisition command from a support service terminal apparatus, to the support service terminal apparatus as meta data. The display control unit displays an error recovery process on the display unit on the basis of user support data transmitted from the support service terminal apparatus in response to the transmitted meta data.

A support service system according to an embodiment of the present disclosure displays an error recovery process. The support service system includes an electronic device and a support service terminal apparatus. The electronic device includes an input unit, a display unit, a meta data transmitting unit, and a display control unit. The support service terminal apparatus includes a meta data analyzing unit and a remote control unit. The input unit accepts an operation of a user. The display unit displays an operation screen for the user. The meta data transmitting unit transmits screen image data on the display unit, user operation information input via the input unit, and state information about the electronic device, which are collected upon reception of a meta data acquisition command from the support service terminal apparatus, to the support service terminal apparatus as meta data. The display control unit displays an error recovery process on the display unit on the basis of user support data transmitted from the support service terminal apparatus. The meta data analyzing unit analyzes the meta data transmitted from the electronic device in response to the meta data acquisition command. The remote control unit transmits the meta data acquisition command to the electronic device and transmits the user support data selected on the basis of a result of the analysis of the meta data by the meta data analyzing unit to the electronic device.

A method of displaying an error recovery process on an electronic device according to an embodiment of the present disclosure includes accepting an operation of a user; displaying an operation screen for the user; transmitting displayed screen image data, accepted user operation information, and state information about the electronic device, which are collected upon reception of a meta data acquisition command from a support service terminal apparatus, to the support service terminal apparatus as meta data; and displaying an error recovery process on the basis of user support data transmitted from the support service terminal apparatus in response to the transmitted meta data.

A non-transitory computer readable recording medium according to an embodiment of the present disclosure records an image forming program that causes a computer to function as an electronic device displaying an error recovery process. The program causes the computer to function as an input unit, a display unit, a meta data transmitting unit, and a display control unit. The input unit accepts an operation of a user. The display unit displays an operation screen for the user. The meta data transmitting unit transmits screen image data on the display unit, user operation information input via the input unit, and state information about the electronic device, which are collected upon reception of a meta data acquisition command from a support service terminal apparatus, to the support service terminal apparatus as meta data. The display control unit displays an error recovery process on the display unit on the basis of user support data transmitted from the support service terminal apparatus in response to the transmitted meta data.

Additional features and advantages are described herein, and will be apparent from the following Detailed Description and the figures.

DETAILED DESCRIPTION

Reference will now be made in detail to various embodiments of the disclosure, one or more examples of which are illustrated in the accompanying drawings. Each example is provided by way of explanation of the disclosure, and by no way limiting the present disclosure. In fact, it will be apparent to those skilled in the art that various modifications, combinations, additions, deletions and variations can be made in the present disclosure without departing from the intended scope or spirit. For instance, features illustrated or described as part of one embodiment can be used in another embodiment to yield a still further embodiment. It is intended that the present disclosure cover such modifications, combinations, additions, deletions, applications and variations that come within the scope of the appended claims and their equivalents.

Embodiments of the present disclosure will herein be described with reference to the attached drawings.

Figure 1:
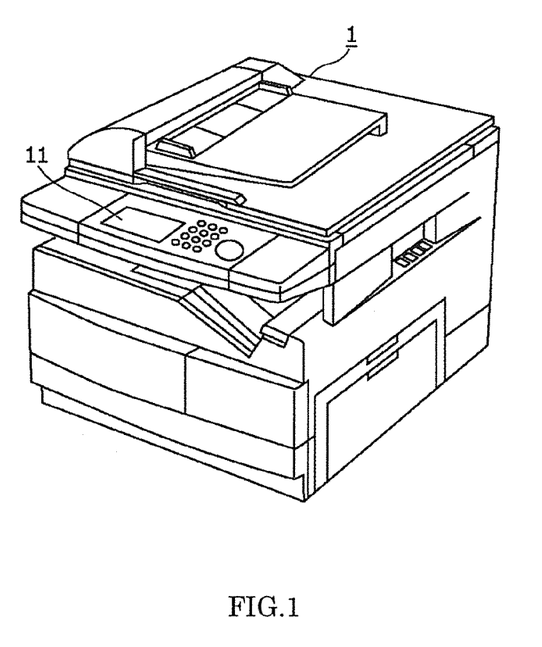
FIG. 1 is a perspective view of an image forming apparatus according to an embodiment of the present disclosure.

FIG. 1 is a perspective view of an image forming apparatus 1 according to an embodiment. The image forming apparatus 1 is an example of an electronic device and is illustrated as a multifunction peripheral. The image forming apparatus 1 includes an operation panel 11 that accepts a user operation. The image forming apparatus 1 may be another apparatus having a print function, such as a printer, a facsimile machine, or a copier.

Figure 2:
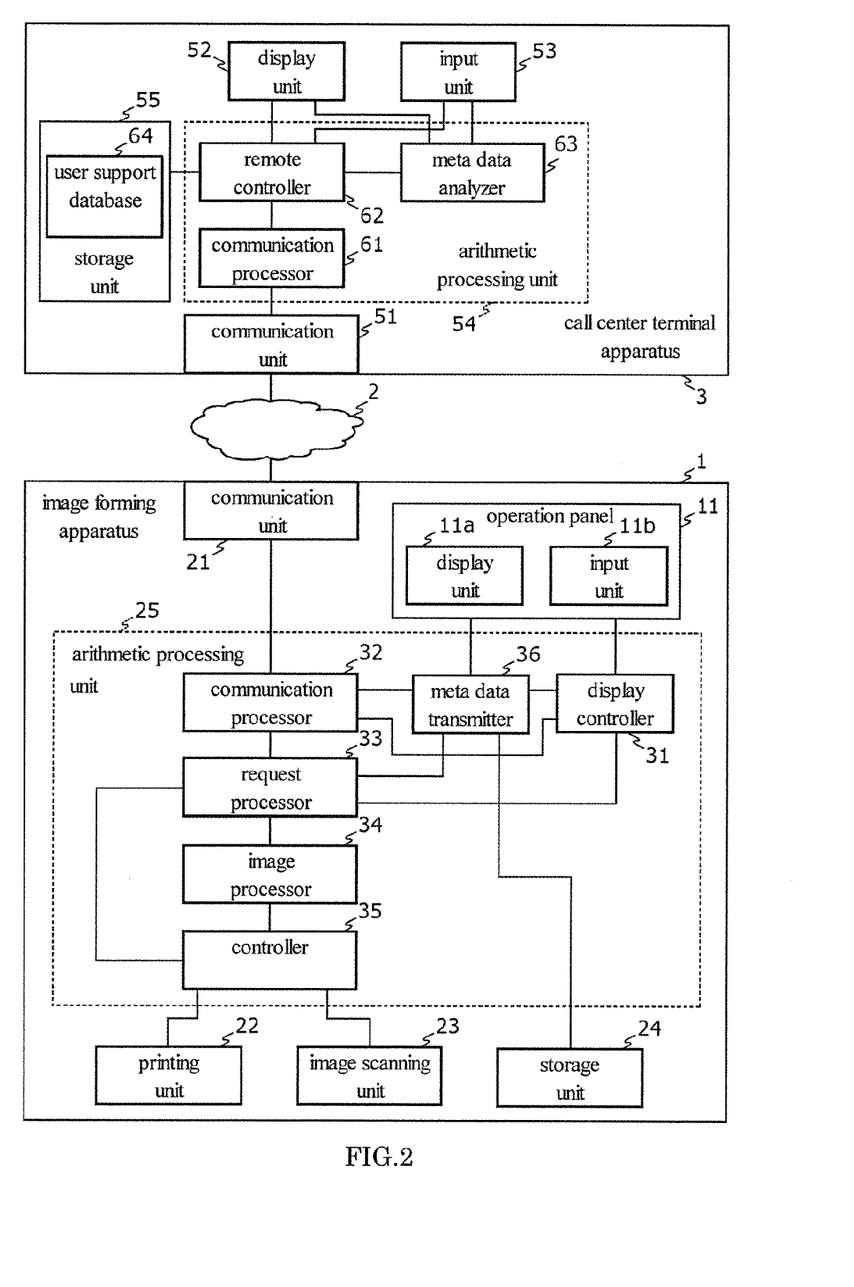
FIG. 2 is a block diagram showing an example of the configuration of a support service system including the image forming apparatus shown in FIG. 1 and a call center terminal apparatus.

FIG. 2 is a block diagram showing an example of the configuration of a support service system including the image forming apparatus 1 shown in FIG. 1 and a call center terminal apparatus 3.

Referring to FIG. 2, the image forming apparatus 1 includes the operation panel 11, a communication unit 21, a printing unit 22, an image scanning unit 23, a storage unit 24, and an arithmetic processing unit 25.

The operation panel 11 includes a display unit 11a, such as a liquid crystal display, and an input unit 11b, such as a touch panel. The operation panel 11 displays an operation screen for the user and detects a user operation.

The communication unit 21 is connectable to a host apparatus (not shown) and the call center terminal apparatus 3 over a network 2 and performs data communication using a certain communication protocol. The network 2 is a computer network including a local area network (LAN) and/or the Internet, for example.

The printing unit 22 is an internal unit that prints a document image on a print sheet by, for example, an electrophotographic method. The image scanning unit 23 is an internal unit that optically scans a document image from a document to generate image data about the document image.

The storage unit 24 is, for example, a semiconductor memory or a hard disk drive that stores data and/or programs.

The arithmetic processing unit 25 is a computer including a central processing unit (CPU), a read only memory (ROM), a random access memory (RAM), and so on. The arithmetic processing unit 25 loads a program stored in the storage unit 24 or another storage device (not shown) into the RAM and executes the program with the CPU to implement various processors.

After the image forming apparatus 1 is activated, various programs are appropriately executed by the arithmetic processing unit 25. In this embodiment, processors including a display controller 31, a communication processor 32, a request processor 33, an image processor 34, a controller 35, and a meta data transmitter 36 are implemented in the arithmetic processing unit 25. The above processors may be collectively implemented using one or more physical processors (i.e. each may, but need not, comprise its own processor).

The display controller 31 displays a screen in the display unit 11a and performs screen transition of the display unit 11a in accordance with a user operation with the input unit 11b. Upon detection of a certain user operation, the display controller 31 submits a request for the user operation to the request processor 33. Upon detection of a certain error occurring in the image forming apparatus 1 by, for example, the request processor 33, the display controller 31 displays an error screen indicating the content of the error in the display unit 11a.

In addition, the display controller 31 displays a response screen that is based on user support data transmitted from the call center terminal apparatus 3 and that indicates, for example, the description of an error recovery process in response to an error inquiry from the user in the display unit 11a.

The communication processor 32 controls the communication unit 21 to perform the data communication with the call center terminal apparatus 3 or the host apparatus.

The request processor 33 accepts, for example, a print request based on a user operation with the operation panel 11 or a print request supplied from the host apparatus or a copy request and controls, for example, the printing unit 22 or the image scanning unit 23 with the controller 35 in response to the request to execute a job. In addition, the request processor 33 functions as a login processor that performs a login process of the user who is operating the input unit 11b in the operation panel 11. In the login process, the user is identified with a user identifier (ID) input by the user. User authentication is also performed in the login process, if necessary, on the basis of the user ID and a password input by the user.

For example, upon reception of document data in a certain data format, such as a page description language (PDL) or a portable document format (PDF), from the host apparatus as the print request, the request processor 33 generates image data from the document data. Upon reception of the copy request by a user operation with the operation panel 11 from the display controller 31, the request processor 33 acquires image data of a document image scanned by the image scanning unit 23.

Print settings applied in the printing are specified, for example, in the print request supplied from the host apparatus or by a user operation with the operation panel 11.

The image processor 34 performs certain image processing to the image data to generate print data (for example, print image data that is binarized for every color).

The controller 35 is a processor that monitors and controls the internal units including the printing unit 22 and the image scanning unit 23.

Upon reception of a meta data acquisition command from the call center terminal apparatus 3, the meta data transmitter 36 stores snapshot image data on the screen, user operation information, and state information about the image forming apparatus 1 in the storage unit 24 as meta data each time the screen transition occurs and transmits the meta data to the call center terminal apparatus 3 with the communication unit 21 and the communication processor 32.

In the present embodiment, the meta data transmitter 36 collects job status information from the request processor 33 as the state information about the image forming apparatus 1.

In addition, in the present embodiment, the meta data transmitter 36 collects login user information about the user who logs in when the meta data acquisition command is received from the request processor 33 as the state information about the image forming apparatus 1. The login user information includes the user ID and attribute information about the user ID (user right information, information about a department to which the user belongs, and so on).

Furthermore, in the present embodiment, the meta data transmitter 36 collects the state information about the internal units including the printing unit 22 and the image scanning unit 23.

In the present embodiment, a screen ID may be allocated to each screen, and the meta data transmitter 36 may include the screen ID of the screen that is being displayed in the meta data in association with the snapshot image data. Alternatively, in the present embodiment, the meta data transmitter 36 may compress the snapshot image data to transmit the compressed snapshot image data.

The call center terminal apparatus 3 is a terminal apparatus, such as a personal computer, installed in a call center (that is, a support center) and is connected to the network 2. Upon provision of a support service for the image forming apparatus 1, the call center terminal apparatus 3 acquires the meta data from the image forming apparatus 1. In addition, the call center terminal apparatus 3 provides the user support data selected on the basis of the result of analysis of the meta data to the image forming apparatus 1.

The call center terminal apparatus 3 includes a communication unit 51, a display unit 52, an input unit 53, an arithmetic processing unit 54, and a storage unit 55.

The communication unit 51 is connectable to the image forming apparatus 1 via the network 2 and performs the data communication using a certain communication protocol.

The display unit 52 is, for example, a liquid crystal display, which displays information about the image forming apparatus 1 to be subjected to the support service for the operator of the call center. The input unit 53 is, for example, a keyboard, which accepts an operation of the operator of the call center.

The arithmetic processing unit 54 may be a computer including a CPU, a ROM, a RAM, and so on. The arithmetic processing unit 54 loads a program stored in the ROM or the storage unit 55 into the RAM and executes the program with the CPU to implement various processors.

The storage unit 55 is a non-volatile storage unit, such as a hard disk drive or a flash memory, that stores data and programs in advance. The storage unit 55 stores a user support database 64. The user support database 64 includes one or multiple pieces of user support data. The user support data selected by the operator of the call center is read from the user support database 64 and is supplied to the image forming apparatus 1.

The user support data includes an image file and text data described in, for example, a markup language such as an extensible markup language (XML). The text data includes a text message to be displayed on a screen and layout information about an image based on the text message and the image file.

After the call center terminal apparatus 3 is activated, various programs are appropriately executed by the arithmetic processing unit 54. In the present embodiment, processors including a communication processor 61, a remote controller 62, and a meta data analyzer 63 are implemented in the arithmetic processing unit 54.

The communication processor 61 controls the communication unit 51 to perform the data communication with the image forming apparatus 1.

The remote controller 62 transmits the meta data acquisition command to the image forming apparatus 1 specified by the operator in accordance with an operation of the operator of the call center with the communication unit 51 and the communication processor 61. In addition, the remote controller 62 reads out the user support data selected based on the meta data analysis by the meta data analyzer 63 from the user support database 64 in response to an operation of the operator of the call center to transmit the user support data to the image forming apparatus 1.

The remote controller 62 may automatically read the user support data corresponding to the result of analysis of the meta data by the meta data analyzer 63 from the user support database 64 to transmit the user support data to the image forming apparatus 1 with the communication unit 51 and the communication processor 61.

The meta data analyzer 63 analyzes the meta data transmitted from the image forming apparatus 1 in response to the meta data acquisition command and displays the result of the analysis in the display unit 52. For example, the meta data analyzer 63 may display an screen image of the image forming apparatus 1, a user operation, and the state of the image forming apparatus 1 upon occurrence of the screen transition of the image forming apparatus 1. In addition, for example, the meta data analyzer 63 may refer to a database (not shown) in which the correspondence between the values of the state information and the causes of errors is accumulated to identify the cause of the error in the image forming apparatus 1 on the basis of the state information and display the cause of the error.

An exemplary operation of each apparatus in the above support service system will now be described.

Figure 3:
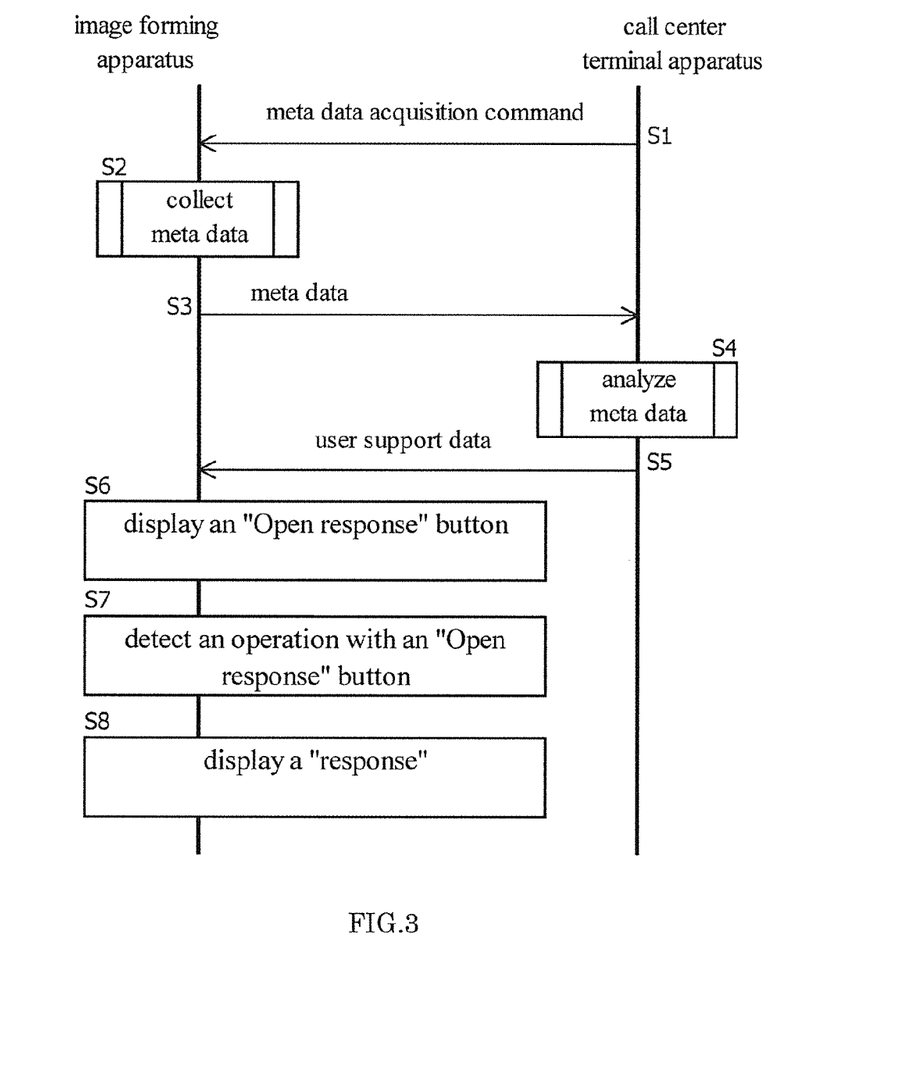
FIG. 3 is a sequence chart describing the operation of each apparatus in the support service system shown in FIG. 2.

FIG. 3 is a sequence chart describing the operation of each apparatus in the support service system shown in FIG. 2.

For example, upon occurrence of an error while the user is using the image forming apparatus 1, the user uses, for example, a telephone to make an inquiry to the call center. In the call center, the operator dealing with the user operates the call center terminal apparatus 3 to identify the image forming apparatus 1 of the user from, for example, the name of the user or the ID of the image forming apparatus 1.

In the call center terminal apparatus 3, in Step S1, the remote controller 62 transmits the meta data acquisition command to the image forming apparatus 1 of the user with the communication unit 51 and the communication processor 61 in accordance with an operation of the operator with the input unit 53.

In the image forming apparatus 1, in Step S2, the meta data transmitter 36 collects the meta data upon reception of the meta data acquisition command with the communication unit 21 and the communication processor 32. Upon reception of the meta data acquisition command, the meta data transmitter 36 captures a screen image of the display unit 11a, each time the screen transition based on a user operation occurs, to generate the snapshot image data, collects the user operation information from the display controller 31, collects the state information from the request processor 33 or the like, and stores the snapshot image data, the user operation information, and the state information in the storage unit 24.

In the present embodiment, the state information includes date and time information for when the screen image is captured, the login user information for when the screen image is captured, the job status information for when the screen image is captured, and status information about the internal units for when the screen image is captured. The status information about the internal units includes the installation status of optional hardware (e.g. an optional memory and/or a finisher, etc. and information indicating whether the optional hardware is installed).

In Step S3, the meta data transmitter 36 completes the collection of the meta data under a certain condition and transmits the collected meta data to the call center terminal apparatus 3. For example, the meta data transmitter 36 completes the collection of the meta data upon detection of a certain user operation. Alternatively, for example, the meta data transmitter 36 completes the collection of the meta data upon reception of an acquisition completion command from the call center terminal apparatus 3.

In the call center terminal apparatus 3, upon reception of the meta data with the communication unit 51 and the communication processor 61, the remote controller 62 passes the meta data to the meta data analyzer 63. In Step S4, the meta data analyzer 63 analyzes the meta data information and displays the result of the analysis in the display unit 52.

The operator provides a support service to the user while watching the result of the analysis. At this time, the operator operates the input unit 53 to select the user support data corresponding to the result of the analysis of the meta data and causes the call center terminal apparatus 3 to transmit the user support data to the image forming apparatus 1.

In the call center terminal apparatus 3, in Step S5, the remote controller 62 reads out the user support data from the user support database 64 in response to the operation with the input unit 53 and transmits the user support data to the image forming apparatus 1.

In the image forming apparatus 1, in Step S6, the display controller 31 displays an "Open response" button in the display unit 11a upon reception of the user support data with the communication unit 21 and the communication processor 32.

Then, when the user operates the input unit 11b to press the "Open response" button, in Step S7, the display controller 31 detects the operation. In Step S8, the display controller 31 displays a "response" (that is, an error recovery process) based on the user support data in the display unit 11a. At this time, for example, the display controller 31 creates multiple screen data files described in the markup language from the user support data and sequentially displays multiple screens while the screen transition is performed on a browser on the basis of the created multiple screen data files.

The collection of the meta data (Step S2) and the analysis of the meta data (Step S4) described above will now be described in detail.

Figure 4:
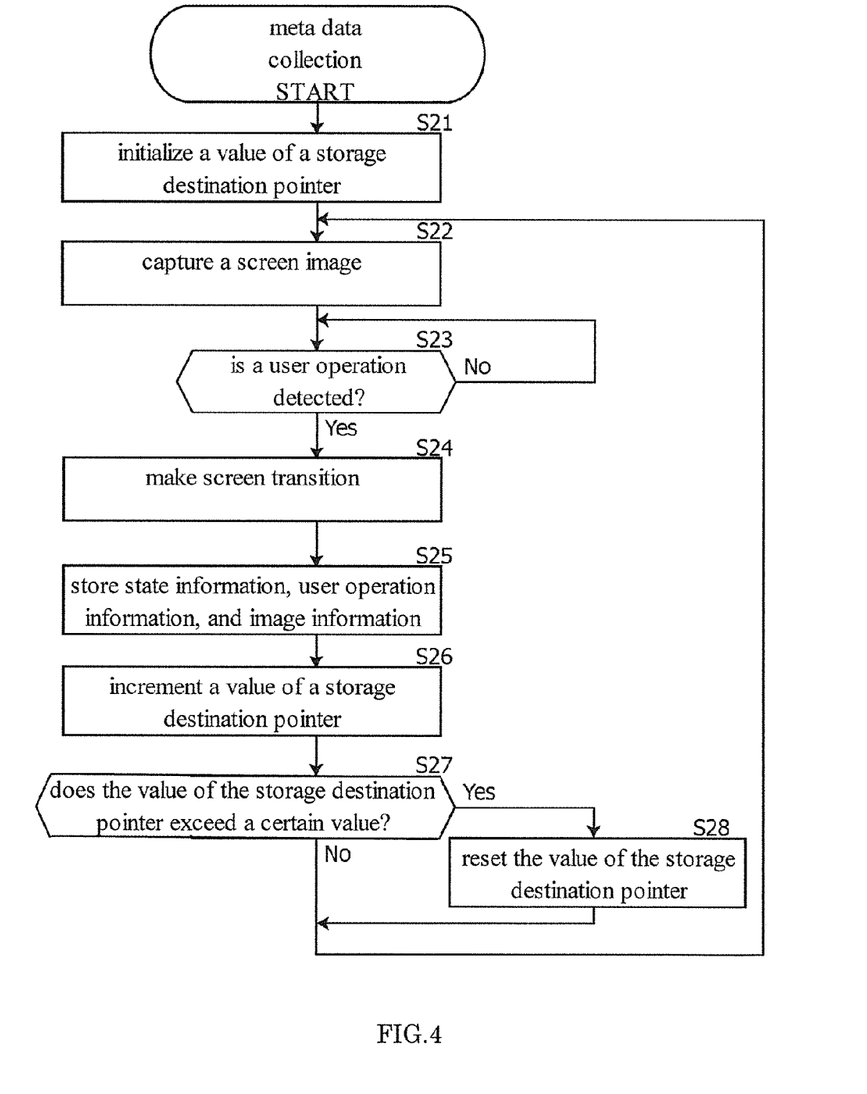
FIG. 4 is a flow chart describing collection of meta data in FIG. 3 in detail.
Figure 5A:
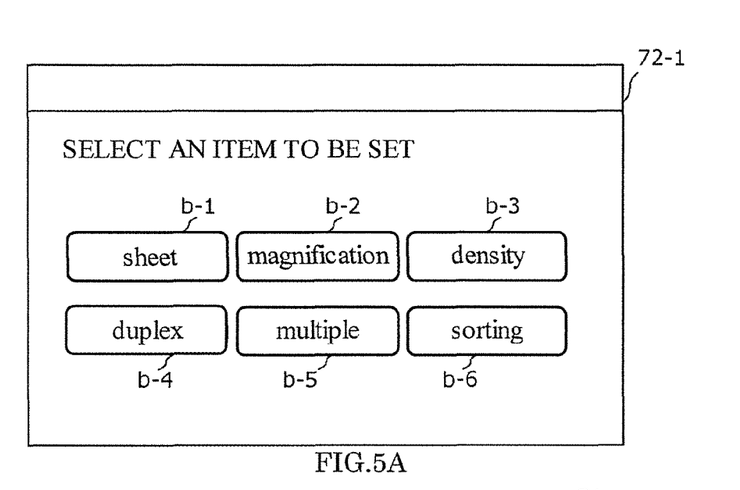
FIGS. 5A to 5C are diagrams describing the meta data.
Figure 5B:
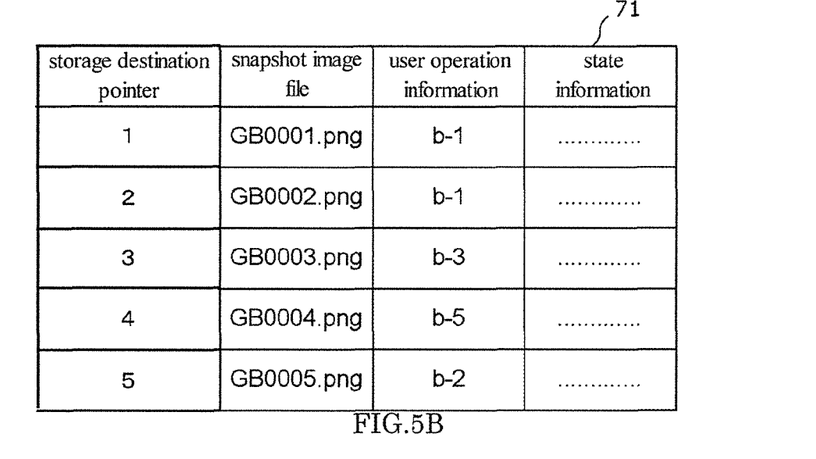
Figure 5C:
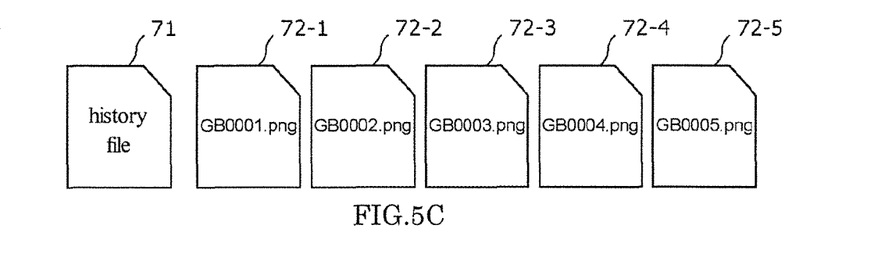

FIG. 4 is a flow chart describing the collection of the meta data (Step S2) in FIG. 3 in detail. FIGS. 5A to 5C are diagrams describing the meta data. FIG. 5A shows an example of the screen image and examples of button IDs used in the user operation information in the meta data. FIG. 5B shows an example of a history file in the meta data. FIG. 5C shows an example of the file structure of the meta data.

Referring to step S21 in FIG. 4, in the image forming apparatus 1, the meta data transmitter 36 initializes the value of a storage destination pointer indicating the storage area in a history file 71 in the storage unit 24 (preferably to one). In Step S22, the meta data transmitter 36 captures the screen of the display unit 11a at this time to generate screen image data. The meta data transmitter 36 creates a unique file name and stores the generated screen image data in the storage unit 24 as a snapshot image file 72-i having the created file name. For example, the image data contained in the screen image shown in FIG. 5A is stored as the snapshot image file 72-1.

In Step S23, it is determined whether a user operation causing the screen transition is detected with the input unit 11b. If a user operation causing the screen transition is detected (Yes in Step S23), in Step S24, the display controller 31 makes the screen transition in accordance with the user operation. The display controller 31 supplies the user operation information to the meta data transmitter 36. For example, button IDs b-1 to b-6 are allocated to six buttons on the screen shown in FIG. 5A. The button ID corresponding to the button pressed by the user is supplied from the display controller 31 to the meta data transmitter 36 as the user operation information.

In Step S25, the meta data transmitter 36 collects the state information from, for example, the request processor 33 upon reception of the user operation information and stores the state information, the user operation information, and the image information (the file name of the file stored in Step S22) in the storage area indicated by the current value of the storage destination pointer.

For example, in the history file 71 shown in FIG. 5B, the file name "GB0001.png" of the snapshot image file 72-1, the button ID "b-1" of the button having the user operation and possibly other information are stored in the storage area when the storage destination pointer has a value of one.

In Step S26, upon completion of the storage, the meta data transmitter 36 increments the value of the storage destination pointer. In Step S27, the meta data transmitter 36 determines whether the value of the storage destination pointer exceeds a certain value (e.g. the number of the storage areas reserved in advance). If the value of the storage destination pointer exceeds the certain value (Yes in Step S27), in Step S28, the meta data transmitter 36 resets the value of the storage destination pointer to one.

Then, the process goes back to Step S22 and the meta data transmitter 36 captures a screen after the screen transition and, in Step S23, waits for detection of a user operation causing the screen transition.

For example, as shown in FIG. 5C, the history file 71 is updated for every screen transition and the snapshot image file 72-1 is added in the above manner. The meta data transmitter 36 reads out the history file 71 and the snapshot image file 72-1, . . . from the storage unit 24 under a certain condition and transmits the history file 71 and the snapshot image file(s) 72-1, . . . to the call center terminal apparatus 3.

Figure 6:
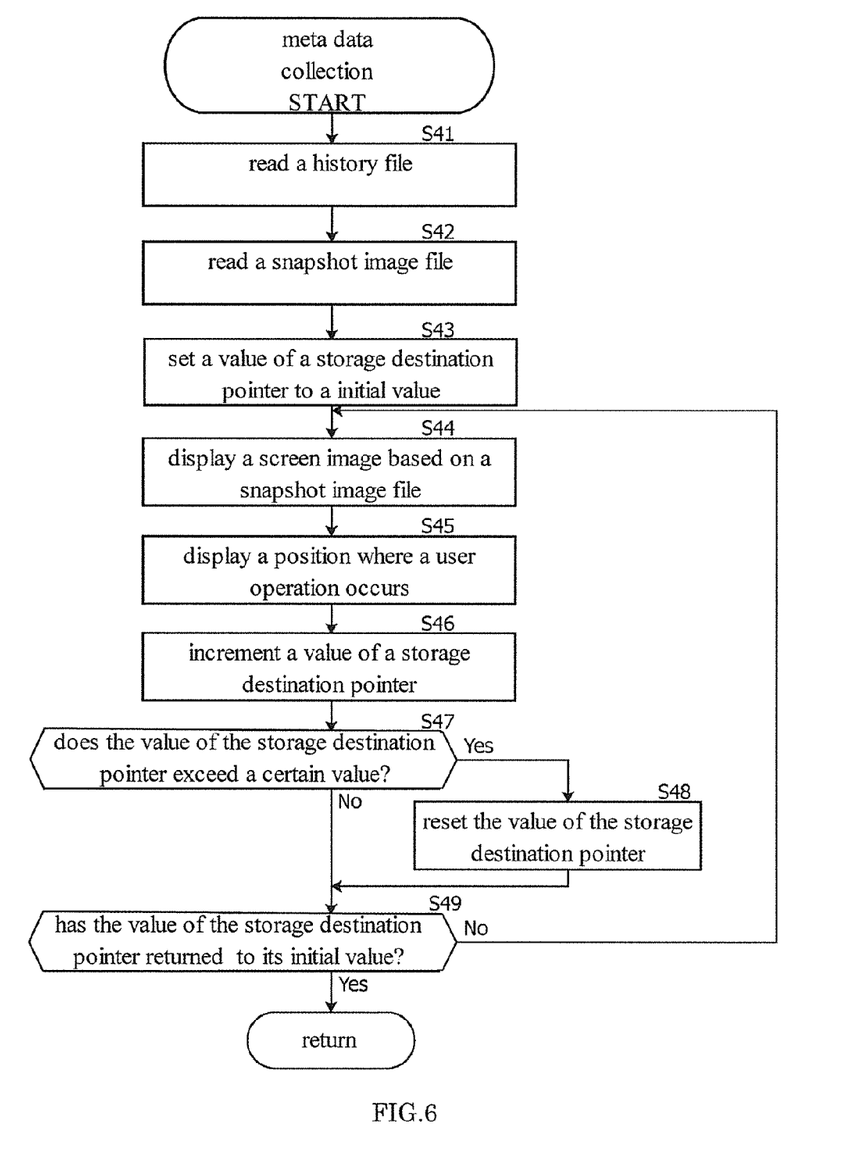
FIG. 6 is a flow chart describing analysis of the meta data in FIG. 3 in detail.

FIG. 6 is a flow chart describing the analysis of the meta data (Step S4) in FIG. 3 in detail. In step S41, in the call center terminal apparatus 3, the meta data analyzer 63 reads the history file 71 that is received. In Step S42, the meta data analyzer 63 reads the snapshot image file(s) 72-1, . . . that are received.

In Step S43, the meta data analyzer 63 identifies the initial value of the storage destination pointer on the basis of the meta data and sets the value of the storage destination pointer to the initial value. For example, in the image forming apparatus 1, a flag is set to each storage area in the history file 71 and the value of the flag of the storage area where the initial (that is, the first collected) record is stored is differentiated from the values of the flags of the other storage areas. The meta data analyzer 63 identifies the initial value of the storage destination pointer (that is, the value of the storage destination pointer of the storage area where the initial record is stored) from the value of the flag.

In Step S44, the meta data analyzer 63 displays, in the display unit 52, the screen image based on the snapshot image file having the file name in the storage area having the same value as that of the storage destination pointer at this time. In Step S45, the meta data analyzer 63 indicates the position where the user operation occurs in the screen image displayed in the display unit 52 on the basis of the user operation information in the storage area. For example, the color or the luminance of the button subjected to the user operation is varied. At this time, the meta data analyzer 63 also displays the state information in the storage area and the result of the analysis of the state information.

When a certain time elapses since the start of the display in Steps S44 and S45 or upon occurrence of a certain operation by the operator, in Step S46, the meta data analyzer 63 increments the value of the storage destination pointer. In Step S47, the meta data analyzer 63 determines whether the value of the storage destination pointer exceeds a certain value (the number of the storage areas ensured in advance). If the value of the storage destination pointer exceeds a certain value (Yes in Step S47), then in Step S48, the meta data analyzer 63 resets the value of the storage destination pointer to one.

In Step S49, the meta data analyzer 63 determines whether the value of the storage destination pointer returns to the initial value set in Step S43. If the value of the storage destination pointer returns to the initial value (Yes in Step S49), the analysis step is completed. If the value of the storage destination pointer does not return to the initial value (No in Step S49), then the process goes back to Step S44 and, in Steps S44 and S45, the meta data analyzer 63 displays the screen image and so on of the subsequent screen.

The pieces of information about the screens recorded in the history file 71 are sequentially displayed in the above manner. Upon completion of the display of the information about all the screens, the analysis step is completed.

As described above, according to the present embodiment, in the image forming apparatus 1, the meta data transmitter 36 collects the screen image data on the display unit 11a, the user operation information with the input unit 11b, and the state information about the image forming apparatus 1 upon reception of the meta data acquisition command from the call center terminal apparatus 3 and transmits the screen image data, the user operation information, and the state information that are collected to the call center terminal apparatus 3 as the meta data. The display controller 31 displays the error recovery process on the display unit 11a on the basis of the user support data transmitted from the call center terminal apparatus 3. In the call center terminal apparatus 3, the remote controller 62 transmits the meta data acquisition command to the image forming apparatus 1 and transmits the user support data selected on the basis of the meta data to the image forming apparatus 1. The meta data analyzer 63 analyzes the meta data transmitted from the image forming apparatus 1 in response to the meta data acquisition command.

Since the user support data is selected on the basis of the user operation and the state of the image forming apparatus 1 when the user operation is performed, it is possible to provide appropriate support to the user.

For example, when the image forming apparatus 1 has a function that becomes available due to addition of an optional memory, the operation unit to execute the function is not displayed on the screen in a state in which the optional memory is unavailable due to contact failure or the like. Since the user does not know the presence of the optional memory in such a case, the call center operator is unable to recognize the unavailability of the optional memory without the present embodiment. However, according to the present embodiment, it is possible for the operator to recognize the state of the optional memory from the state information about the image forming apparatus 1.

In addition, for example, when the image forming apparatus 1 has a function to allow the image forming apparatus 1 to separate a failing part and to continue the operation with the remaining parts, it is possible for the operator to recognize the separation of the failing part from the state information about the image forming apparatus 1.

In the above examples, since the operator can accurately know the state of the image forming apparatus 1 from the state information about the image forming apparatus 1, the user support data indicating the error recovery process appropriate for the state is selected.

While the present invention has been described in terms of exemplary embodiments, it will be clear that the present invention is not limited to these specific examples and embodiments and that various changes and modifications can be made within the spirit and scope of the present invention.

What is claimed is:

1. A support service system displaying an error recovery process, the support service system comprising:
   an electronic device; and
   a support service terminal apparatus,
   wherein the electronic device includes
      an input unit configured to accept an operation of a user;
      a first display unit configured to display an operation screen for the user;
      a meta data transmitting unit configured to transmit screen image data on the first display unit, user operation information including a button ID corresponding to a button pressed by the user input via the input unit, and state information about the electronic device, which are collected upon reception of a meta data acquisition command from the support service terminal apparatus, to the support service terminal apparatus as meta data; and
      a display control unit configured to display an error recovery process on the first display unit on the basis of user support data transmitted from the support service terminal apparatus, and
   wherein the support service terminal apparatus includes
      a meta data analyzing unit configured to analyze the meta data transmitted from the electronic device in response to the meta data acquisition command;
      a second display unit configured to display an image of the screen image data including the button pressed by the user, on the basis of a result of the analysis of the meta data by the meta data analyzing unit; and
      a remote control unit configured to transmit the meta data acquisition command to the electronic device and to transmit the user support data selected on the basis of the result of the analysis of the meta data by the meta data analyzing unit to the electronic device,
   wherein color or luminance of the button pressed by the user is varied in the image displayed on the second display unit.

2. The support service system according to claim 1, wherein the electronic device further includes:
   a request processing unit configured to accept a request to execute a job corresponding to the accepted request,
   wherein the meta data transmitting unit collects job status information from the request processing unit as the state information.

3. The support service system according to claim 1, wherein the electronic device further includes:
   a login processing unit configured to perform a login process of the user,
   wherein the meta data transmitting unit collects login user information from the login processing unit as the state information.

4. The support service system according to claim 1, wherein the electronic device further includes:
   an internal unit configured to carry out a function of the electronic device,
   wherein the meta data transmitting unit collects the state information about the internal unit upon reception of the meta data acquisition command.

\* \* \* \* \*